United States Patent
Loechelt

(10) Patent No.: US 9,966,846 B2
(45) Date of Patent: May 8, 2018

(54) CIRCUIT INCLUDING DUAL POWER CONVERTERS AND AN INDUCTOR AND A METHOD OF USING AN ELECTRONIC DEVICE INCLUDING A CIRCUIT INCLUDING DUAL POWER CONVERTERS AND AN INDUCTOR

(71) Applicant: SEMICONDUCTOR COMPONENTS INDUSTRIES, LLC, Phoenix, AZ (US)

(72) Inventor: Gary H. Loechelt, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days. days.

(21) Appl. No.: 15/155,329

(22) Filed: May 16, 2016

(65) Prior Publication Data

US 2017/0222555 A1 Aug. 3, 2017

Related U.S. Application Data

(60) Provisional application No. 62/288,691, filed on Jan. 29, 2016.

(51) Int. Cl.
*H02M 3/158* (2006.01)
*H02M 1/08* (2006.01)

(52) U.S. Cl.
CPC .............. *H02M 3/158* (2013.01); *H02M 1/08* (2013.01)

(58) Field of Classification Search
None
See application file for complete search history.

(56) References Cited

U.S. PATENT DOCUMENTS

| 5,739,564 A | 4/1998 | Kosa et al. |
|---|---|---|
| 6,023,154 A | 2/2000 | Martinez |
| 6,211,657 B1 | 4/2001 | Goluszek |
| 7,071,662 B2 * | 7/2006 | Hsu ..................... H02M 3/1584 323/272 |
| 2011/0188218 A1 * | 8/2011 | Hsing ..................... H01R 9/00 361/772 |

(Continued)

OTHER PUBLICATIONS

Ching, T.W. et al., "Review of Soft-Switching Techniques for High-Frequency Switched-Mode Power Converters," IEEE Vehicle Power and Propulsion Conference (VPPC), Sep. 3-5, 2008, Harbin, China, 6 pages.

(Continued)

*Primary Examiner* — Jeffrey Gblende
(74) *Attorney, Agent, or Firm* — Abel Law Group, LLP

(57) ABSTRACT

A circuit can include a pair of switching devices that are coupled to an intermediate switching node and another pair of switching devices that are coupled to an output node. The circuit can further include a magnetic element that can help to store energy when the circuit transitions from a low state to a high state and release the energy when the circuit transitions from a high state to a low state. The circuit can include a control device to allow synchronous operation between the different pairs of switching devices. The magnetic element can help to reduce voltage swings at the output switching node. Thus, switching devices within each of the pairs can be optimized to allow for better performance of the circuit.

19 Claims, 5 Drawing Sheets

(56) References Cited

U.S. PATENT DOCUMENTS

| | | | |
|---|---|---|---|
| 2011/0254526 A1* | 10/2011 | Luo | H02M 3/1584 |
| | | | 323/284 |
| 2015/0103575 A1* | 4/2015 | Ku | H02M 7/48 |
| | | | 363/132 |
| 2015/0214859 A1* | 7/2015 | Chen | H02M 7/53873 |
| | | | 363/132 |
| 2016/0268900 A1* | 9/2016 | Miyazaki | H02M 1/088 |

OTHER PUBLICATIONS

Shoyama, Masahito et al., "Resonant Switched Capacitor Converter with High Efficiency," 35th Annual IEEE Power Electronics Specialists Conference, Aachen, Germany, dated 2004, pp. 3780-3786.

* cited by examiner

US 9,966,846 B2

CIRCUIT INCLUDING DUAL POWER CONVERTERS AND AN INDUCTOR AND A METHOD OF USING AN ELECTRONIC DEVICE INCLUDING A CIRCUIT INCLUDING DUAL POWER CONVERTERS AND AN INDUCTOR

CROSS-REFERENCE TO RELATED APPLICATION(S)

This application claims priority to U.S. Provisional Application No. 62/288,691, filed on Jan. 29, 2016, entitled "Circuit Including Dual Power Converters and an Inductor and a Method of Using an Electronic Device Including a Circuit Including Dual Power Converters and an Inductor," invented by Gary H. Loechelt, and is incorporated herein by reference and priority thereto for common subject matter is hereby claimed.

FIELD OF THE DISCLOSURE

The present disclosure relates to circuits including dual converters and inductors and methods of using electronic devices including circuits including power converters and inductors.

RELATED ART

Power converters can have relatively high current flow that switch at a relatively high frequency. An example of such a power converter can be a high-frequency voltage regulator. Switching within the power converter can cause ringing at a switching node. Improvements in reduced ringing, improved current flow, and recovering energy during and after switching are desired.

BRIEF DESCRIPTION OF THE DRAWINGS

Embodiments are illustrated by way of example and are not limited in the accompanying figures.

Figure 1:
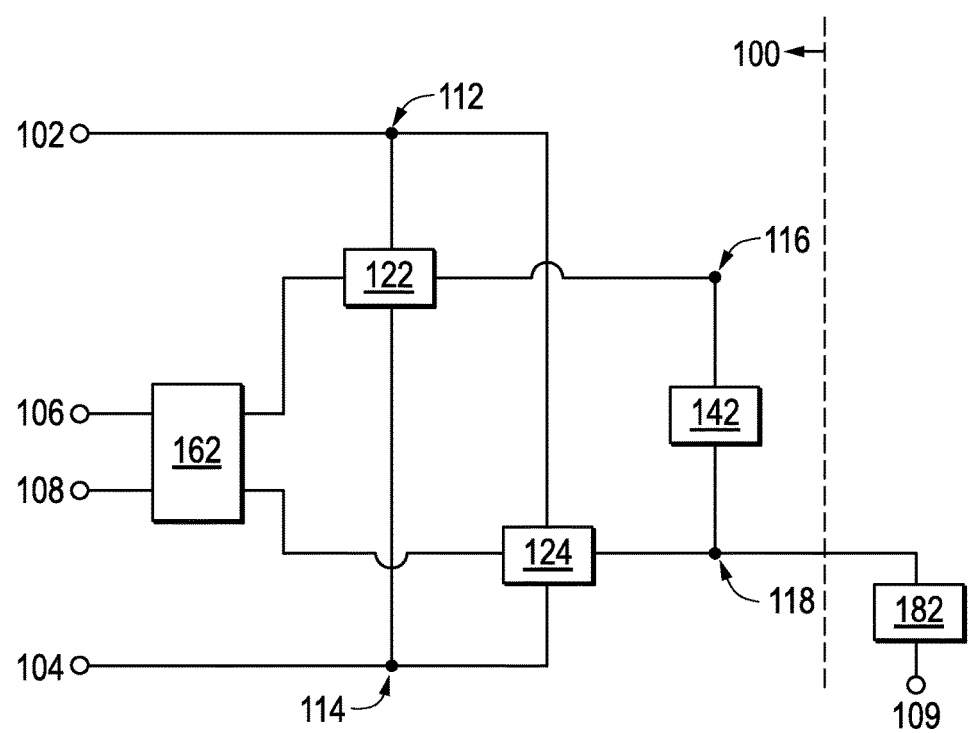
FIG. 1 includes a diagram of a circuit in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Also, for conceptual simplicity, some structures that are represented by a single circuit element may in fact correspond to multiple physical elements connected either in series, in parallel, or in some other series and parallel combination.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

As used herein, the term "coupled" is intended to mean a connection, linking, or association of two or more electronic components, circuits, systems, or any combination of: (1) at least one electronic component, (2) at least one circuit, or (3) at least one system in such a way that a signal (e.g., current, voltage, or optical signal) may be transferred from one to another. Non-limiting examples of "coupled" can include electrical connections between electronic component(s), circuit(s) or electronic component(s) with switch(es) (e.g., transistor(s)) connected between them, or the like.

The term "electrically connected," with respect to electronic components, circuits, or portions thereof, is intended to mean that two or more electronic components, circuits, or any combination of at least one electronic component and at least one circuit do not have any intervening electronic component lying between them. Parasitic resistance, parasitic capacitance, parasitic inductance, or any combination thereof is not considered an electronic component for the purposes of this definition. In one embodiment, electronic components are electrically connected when they are electrically shorted to one another and lie at substantially the same voltage.

The terms "high power supply" and "low power supply" are relative to each other such that the voltage of the high power supply minus the voltage of the lower power supply is greater than 0 V (i.e., $(V_{HPS}-V_{LPS})>0$ V). For example, both $V_{HPS}$ and $V_{LPS}$ can be positive voltages; both $V_{HPS}$ and $V_{LPS}$ can be negative voltages; $V_{HPS}$ can be a positive voltage, and $V_{LPS}$ can be a negative voltage or 0 V; or $V_{HPS}$ can be a positive voltage or 0V, and $V_{LPS}$ can be a negative voltage.

The term "normal operation" and "normal operating state" refer to conditions under which an electronic component or device is designed to operate. The conditions may be obtained from a data sheet or other information regarding voltages, currents, capacitance, resistance, or other electrical conditions. Thus, normal operation does not include operating an electrical component or device well beyond its design limits.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the semiconductor and electronic arts.

A circuit can include switching devices and a magnetic element, wherein the switching devices are configured to be operated in synchronously. In an embodiment, a circuit can include an input node, an output node, an intermediate node, and a reference node. The circuit can also include a first pair of switching devices with a first control terminal and a second control terminal, wherein the pair of switching devices is configured to provide a first conduction path between the input node and the intermediate node when a first control signal is applied to the first control terminal, and to provide a second conduction path between the intermediate node and the reference node when a second control signal is applied to the second control terminal. The circuit can further include a second pair of switching devices with a third and a fourth control terminal, wherein the second pair of switching devices is configured to provide a third conduction path between the input node and the output node when a third control signal is applied to the third control terminal, and to provide a fourth conduction path between the output node and the reference node when a fourth control signal is applied to the fourth control terminal. The magnetic element can be coupled to the intermediate node and the output node such that current can flow through the magnetic element without passing through the second pair of switching devices. The circuit can still further include a control device configured to supply the first, second, third, and fourth control signals, such that the first and third control signals are simultaneously in a state to provide a conduction path from the input node during part of a switching period of the circuit.

In another embodiment, a circuit can include a first power converter having a first power supply terminal, a second power supply terminal, a first control terminal, and a first output terminal; a second power converter having a third power supply terminal, a fourth power supply terminal, a second control terminal, and a second output terminal; a control device having a first output terminal and a second output terminal; and a magnetic element having a first terminal and a second terminal. The first power supply terminal and the third power supply terminal can be coupled to a first power supply node, the second power supply terminal and the fourth power supply terminal can be coupled a second power supply node; the first control terminal of the first power converter can be coupled to the first output terminal of the control device, and the second control terminal of the second power converter can be coupled to the second output terminal of the control device. The first output terminal of the first power converter and the first terminal of the magnetic element can be coupled at a first switching node, and the second output terminal of the second power converter and the second terminal of the magnetic element can be coupled at a second switching node. The control device can be configured to allow the first and second power converters to be in a high state simultaneously or in a low state simultaneously.

In another aspect, a method of using a circuit can include providing a circuit that includes an input node, an output node, an intermediate node, and a reference node; a first high-side switching device having a first current-carrying terminal coupled to the input node, and a second current-carrying terminal coupled to the intermediate node; a first low-side switching device having a third current-carrying terminal coupled to the intermediate node, and a fourth current-carrying terminal coupled to the reference node; a second high-side switching device having a fifth current-carrying terminal coupled to the input node, and a sixth current-carrying terminal coupled to the output node; a second low-side switching device having a seventh current-carrying terminal coupled to the output node, and an eighth current-carrying terminal coupled to the reference node; and an inductor having a first terminal coupled to the intermediate node and a second terminal coupled to the output node. The method can further include activating the first high-side switching device and activating the second high-side switching device, wherein during a first time period, the first and second high-side switching devices are simultaneously activated.

Embodiments as described herein can help reduce voltage swings at a switching node closer to a load coupled to the circuit by storing energy within a magnetic element, such as an inductor. The reduced voltage swings allow switching elements, such as transistors, to be designed that can have a reduced avalanche breakdown (e.g., drain-to-source breakdown) and allow higher doping levels within semiconductor layers to be used that can help to reduce $R_{DSON}$. Further, the reduced voltage swings can help to reduce driver logic disruptions within the control device. Energy is stored within the magnetic element when the circuit transitions from a low state to a high state, and energy is released when the circuit transitions from a high state to a low state. Thus, the circuit is more efficient as compared to a comparative circuit without a magnetic element that stores energy.

Further, the switching elements in the upstream and downstream power converters can be designed with different performance characteristics. The low-side switching element within the upstream power converter can be designed to withstand greater voltage swings at the intermediate switching node, and the low-side switching element within the downstream power converter does not need to withstand such large voltage swings because the output switching node experiences significantly smaller voltage swings. Thus, the low-side switching element of the downstream converter can be optimized more for increased current flow. Similarly, the high-side switching elements may be separately optimized for the conditions to which they will be exposed, particularly during switching operations.

FIG. 1 includes a diagram of a circuit 100 in accordance with an embodiment. The circuit 100 includes an upstream power converter 122 and a downstream power converter 124, each having a terminal coupled to a high power supply node 112 and the high power supply terminal 102, and another terminal coupled to a low power supply node 114 and a low power supply terminal 104. Each of the power converters 122 and 124 has a control terminal coupled to a control device 162. The control device 162 is configured to allow synchronous operation of the power converters 122 and 124. The circuit 100 further includes a magnetic element 142 having a terminal coupled to a switching node 116 and an output terminal of the power converter 122, and another terminal of the magnetic element 142 coupled to a switching node 118 and an output terminal of the power converter 124. As will be described in more detail below, the magnetic element 142 allows energy to be stored when the circuit 100 transitions to a high state, and releases energy when the circuit 100 transitions to a low state. The circuit 100 can be used to provide power to a load 182. The load 182 has a terminal coupled to the switching node 118 and another terminal coupled to a power supply terminal 109. In an embodiment, the circuit 100 can be a voltage regulator. The control device 162 controls the operation of the power converters 122 and 124. The power converters can be direct current-to-direct current (DC-to-DC) converters. In a particular embodiment, the circuit 100 operates at a frequency of at least 0.0005 MHz, at least 0.02 MHz, or at least 0.2 MHz, and in another particular embodiment, the circuit 100 operates at a frequency of at most 9000 MHz, at most 900 MHz, or at most 20 MHz.

Figure 2:
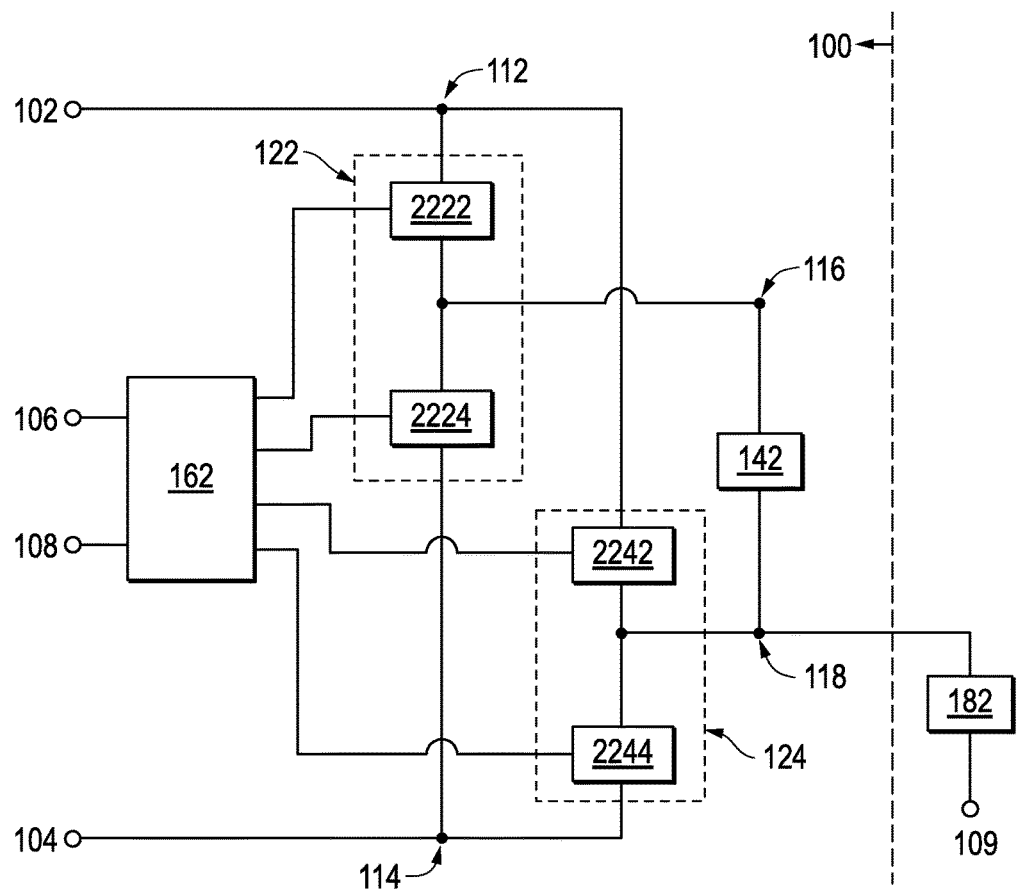
FIG. 2 includes a diagram of a circuit in accordance with a particular embodiment.

In a particular embodiment as illustrated in FIG. 2, the power converter 122 includes a high-side switching element 2222 and a low-side switching element 2224, and the power converter 124 includes a high-side switching element 2242 and a low-side switching element 2244. Each of the high-side switching elements 2222 and 2242 has a terminal coupled to the high power supply terminal 102, each of the low-side switching elements 2224 and 2244 has a terminal coupled to the low power supply terminal 104. Each of the switching elements 2222, 2224, 2242, and 2244 has a control terminal coupled to the control device 162. The control device 162 is configured so that each of the switching elements 2222, 2224, 2242, and 2244 can be activated and deactivated separately from the other switching elements in the circuit 100. The high-side switching elements 2222 and 2242 can have the same or different performance characteristics. For example, the high-side switching element 2222 may have a faster switching speed, and the high-side switching element 2242 may have a lower $R_{DSON}$ and allow for higher current flow. Similar to the high-side switching elements, the low-side switching elements 2224 and 2244 can have the same or different performance characteristics. For example, the low-side switching element 2224 may have a high avalanche breakdown voltage, and the low-side switching element 2244 may have a lower $R_{DSON}$ and allow for higher current flow. Furthermore, the relative sizing of each switching element pair may be different. For example, the size ratio of high-side switching element 2222 to low-side switching element 2224 may be larger than the size ratio of high-side switching element 2242 to low-side switching element 2244 because of peak currents during switching transients, total power loss, or some other operational criterion.

Figure 3:
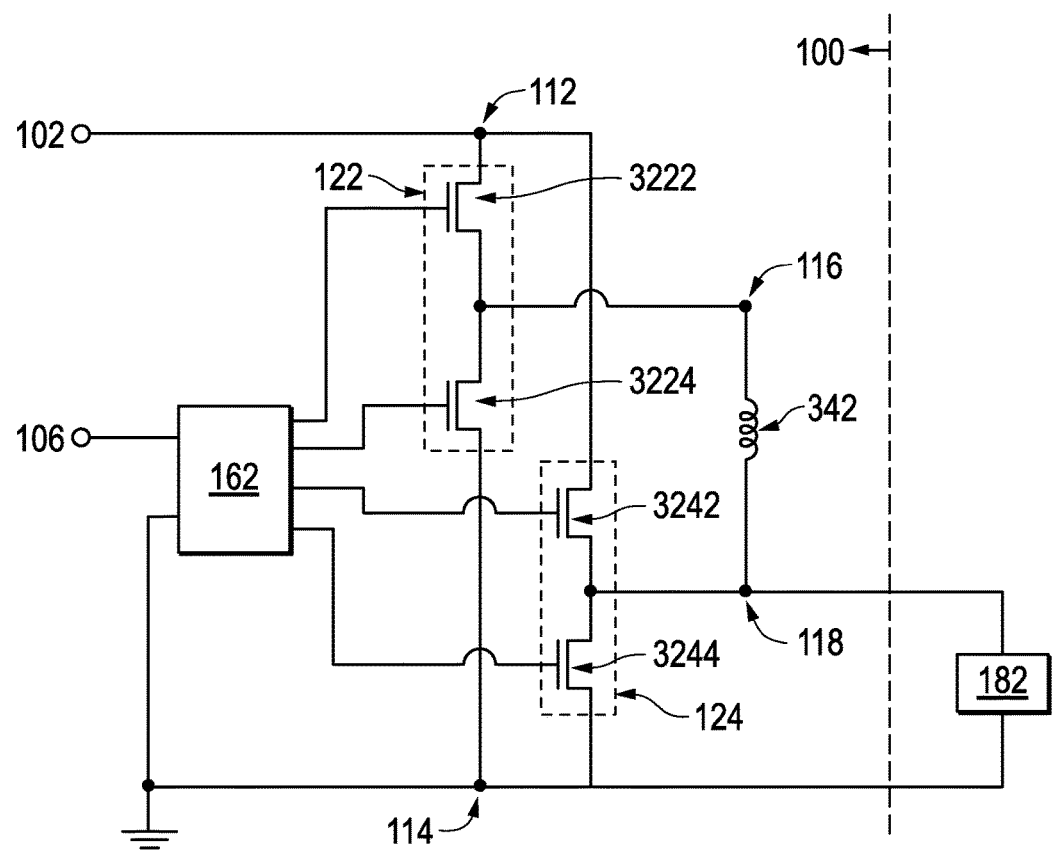
FIG. 3 includes a diagram of a circuit in accordance with a more particular embodiment.

In another particular embodiment as illustrated in FIG. 3 the switching elements 2222, 2224, 2242, and 2242 are transistors 3222, 3224, 3242, and 3244, respectively. In a more particular embodiment, the transistors 3222, 3224, 3242, and 3244 are insulated gate field-effect transistors. The magnetic element 142 (FIGS. 1 and 2) is an inductor 342. The inductor 342 can have an inductance of at least 0.02 nH, at least 0.2 nH, or at least 2 nH, and in another embodiment, the inductance is at most 50 nH, at most 24 nH, at most 16 nH, or at most 8 nH. The power supply terminals 104, 108, and 109 (FIGS. 1 and 2) are at ground potential (FIG. 3). The power supply terminal 102 may be at a nominal voltage in a range of 6 V to 24 V, and the power supply terminal 106 may be at a voltage between the voltage of the power supply terminal 102 and ground potential. For example, the power supply terminal may be at a nominal voltage in a range of 1.2 V to 6.0 V.

All of the circuit 100 may be on the same die or may be split between different dies or other components. For example, a single die may include the power converters 122 and 124 and the control device 162, and the inductor 342 (magnetic element 142 in FIGS. 1 and 2); and the load 182 may be a separate component. In another embodiment, the inductor 342 (magnetic element 142 in FIGS. 1 and 2) can be a separate component. In a further embodiment, the control device 162 may be on a different die, as the ringing at the switching nodes 116 and 118 may interfere with the proper operation of the control device 162. In an alternative embodiment, the power converters 122 and 124 can be on separate die, and in another embodiment, components within one or both of the power converters, that is, any one or more transistors 3222, 3224, 3242, 3244 can be on a different die from any one or more of the other transistors. The ability to integrate components allows for faster operation and less power loss; however, fabrication complication or die size may increase to an unacceptable level. Further, parasitic characteristics may be mixed. For example, parasitic resistance and parasitic inductance between components and may be reduced; however, capacitive coupling between components or between a component and an interconnect within the die may increase. After reading this specification, skilled artisans will be able to simulate different physical designs of the circuit 100 and determine which physical design works well for their particular application.

The operation of the circuit 100 can be principally controlled by the control device 162. The control device 162 may include hardware, firmware, software, or any combination thereof that reflects the voltage of the power supply terminal 102, the time-averaged voltages at the switching nodes 116 and 118, and operating frequency, or the like. Alternatively, in a further embodiment (not illustrated), the control device 162 may include logic or an additional component to allow the control device 162 to receive input regarding the desired operating conditions of the circuit 100 from an external source, for example, a power management controller. In an embodiment (not illustrated), the control device 162 may include sensors with a tap to the power supply node 112, the power supply terminal 102, or both, so that the control device 162 can automatically determine the voltage difference between the power supply nodes 112 and 114. Referring to FIGS. 1 and 2, the control device 162 may include sensors with a tap to the power supply node 114 or the power supply terminal 104.

Figure 4:
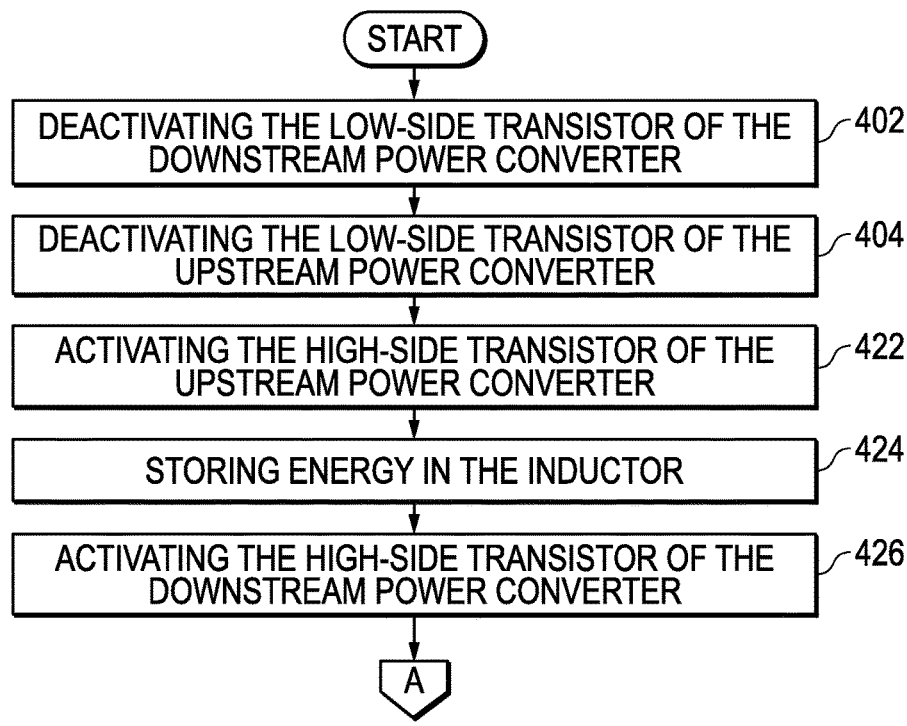
FIGS. 4 and 5 include a process flowchart when the operating the circuit of FIG. 3.
Figure 5:
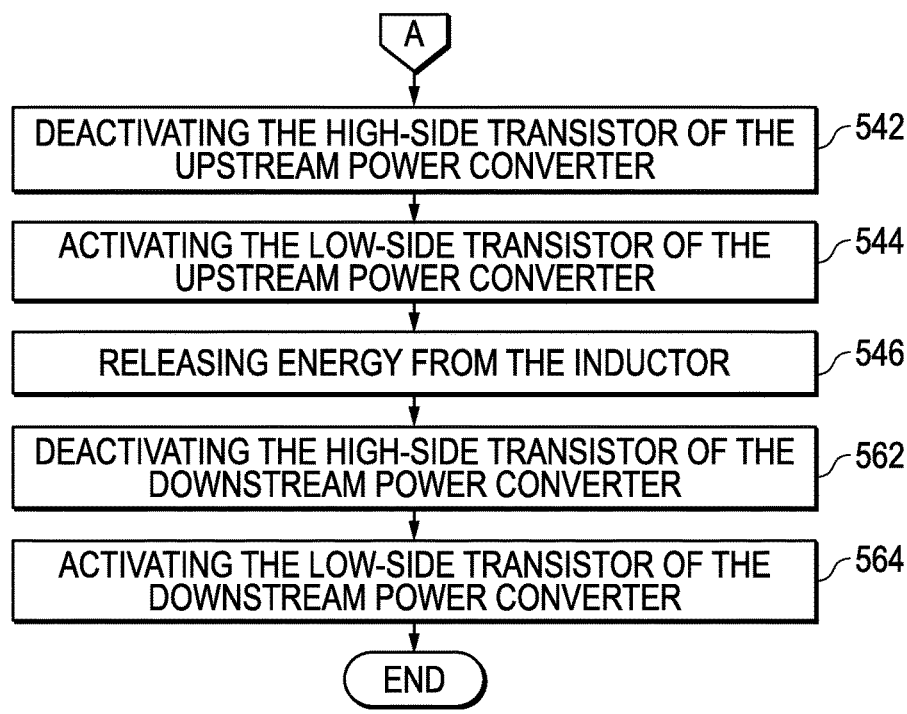
Figure 6:
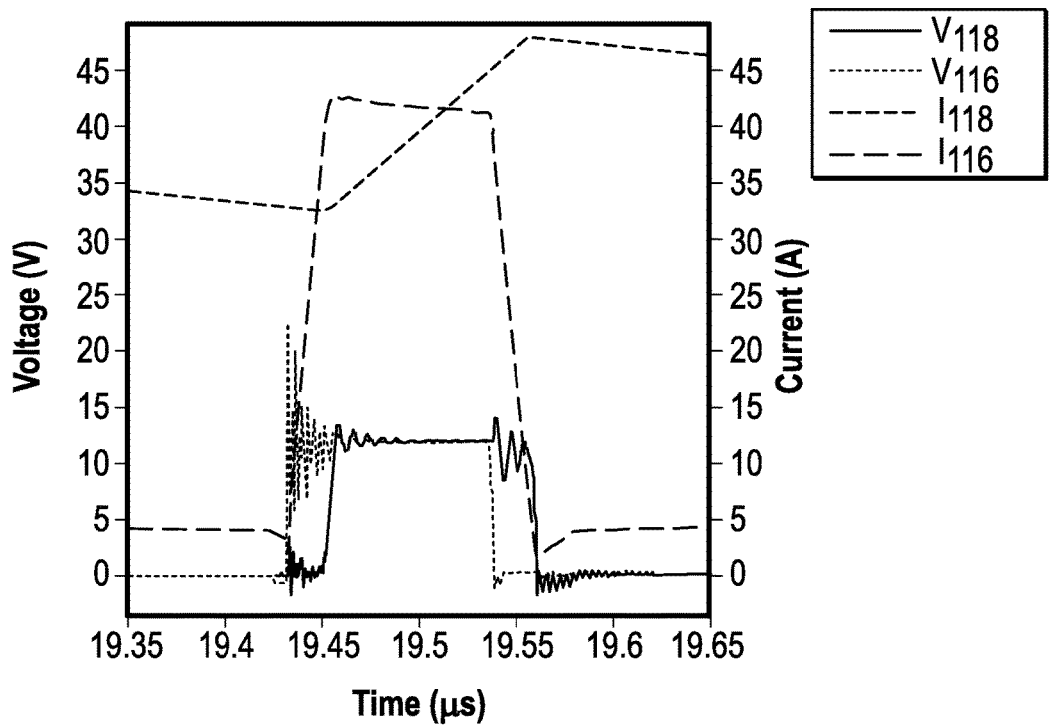
FIG. 6 includes a plot of a simulation of voltage and current as a function of time at the switching nodes when operating the circuit of FIG. 3.
Figure 7:
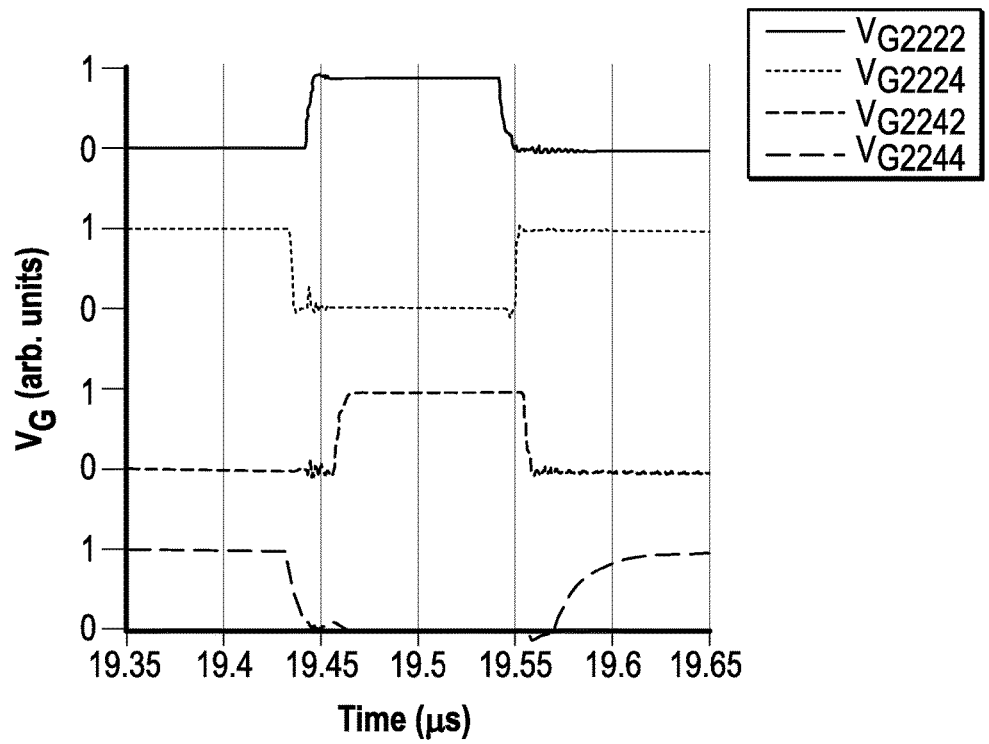
FIG. 7 includes a timing diagram for gate voltages when operating the circuit of FIG. 3.

The operation of the circuit 100 will be principally described with respect to FIGS. 4 and 5 except as otherwise explicitly noted. FIGS. 6 and 7 include timing diagrams of voltage, current, or both as a function of time based on a simulation of the circuit 100. For the simulation, the high power supply 102 is at 12 VDC, the time-average voltage at the switching node 118, which provides a voltage to the load 182, is 1.2 VDC, and the circuit operates at a frequency of 1 MHz. For other voltages and operating frequencies, one or more of the components may need to be differently sized depending on the operating voltages, currents to be provided, operating frequency, another suitable operation parameter, or any combination thereof.

Initially, the circuit 100 is in a low state. The high-side transistors 3222 and 3242 are in a deactivated state, and the low-side transistors 3224 and 3244 are in an activated state.

Briefly referring to FIG. 6, the voltages at the switching nodes 116 and 118 are slightly below ground potential, and are in a range of 0 to −0.5 V.

The method includes deactivating the low-side transistor 3244 of the downstream power converter 124, at block 402 of FIG. 4, and then deactivating the low-side transistor 3224 of the upstream power converter 122, at block 404 of FIG. 4.

A few nanoseconds (<5 ns) later, the method further includes activating the high-side transistor 3222 of the upstream power converter 122, at block 422 in FIG. 4. As can be seen in FIG. 6, ringing occurs at the switching node 116, where the voltage may reach as high as 20 V to 25 V, such as approximately 23 V, and as low as 5 V to 7 V, such as approximately 6 V. The voltage at the switching node 116 will dampen and eventually reach a voltage slightly less than the power supply terminal 102, and such voltage can be in a range of 11.5 V to 12 V. The switching node 118 also experiences some ringing, but such ringing at the switching node 118 is significantly less, and the voltage may not exceed 3 V. During this time, current flowing through the inductor 342 increases at a substantially fast rate, and current flowing to the load 182 decreases. Thus, during this portion of the cycle, the method includes storing energy in the inductor 342, at block 424 in FIG. 4.

The method further includes activating the high-side transistor 3242 of the downstream power converter 124, at block 426 in FIG. 4. The high side-transistor 3242 is activated approximately 20 ns after the high-side transistor 3222 is activated. The time delay between activating the high-side transistors 3222 and 3242 may at least in part depend on the operating frequency of the circuit 100, the current flowing to the load 182, or some other operating condition. For example, once the current flowing through the inductor 342 exceeds the current flowing to the load 182, the switching node 118 can transition from a low to a high state. The high-side transistor 3242 may be activated after this transition occurs to achieve a soft-switching condition, which is a switching of a device from a non-conductive state to a conductive state while there is relatively little voltage sustained across the device. Alternatively, the soft-switching may only be partial, which can occur when the voltage sustained across the switching device at the time of activation is less than half the voltage difference between the high power supply terminal and the low power supply terminal. As seen in FIG. 6, ringing occurs at the switching node 118, and such ringing is significantly less that the ringing that occurred at the switching node 116 just after the high-side transistor 3222 of the upstream power converter 122 is activated. For the switching node 118 after the high-side transistor 3242 is activated, the voltage may remain in a range of 10 V to 15 V, such as 11 V to 14 V. The voltage at the switching node 116 will dampen and eventually reach a voltage slightly less than the power supply terminal 102, and such voltage can be in a range of 11.5 V to 12 V. Each of the high-side transistors 3222 and 3242 is activated for approximately 100 ns. The time duration of the transistors 3222 and 3242 in the active state can depend at least in part on the operation frequency of the circuit 100. The time duration can be changed if the operation frequency of the circuit 100 changes. After reading this specification, skilled artisans will be able determine a time duration for their particular application.

The method can include deactivating the high-side transistor 3222 of the upstream converter 122, at block 542 in FIG. 5. A few nanoseconds (<5 ns) later, the method further includes activating the low-side transistor 3224 of the upstream power converter 122, at block 544 in FIG. 5. As can be seen in FIG. 6, the voltage at the switching node 116 quickly decreases to 0 V. The voltage at the switching node 116 will dampen and eventually reach a voltage below ground potential, and such voltage can be in a range of 0 V to −0.5 V. The switching node 118 also experiences some ringing when the transistors 3222 and 3224 of the upstream converter 122 change states, and such ringing at the switching node 118 is greater when the circuit 100 is transitioning from the high state to the low state as compared to transitioning from the low state to the high state. For the switching node 118 after the low-side transistor 3224 is activated, the voltage may remain in a range of 6 V to 15 V, such as 8 V to 13 V until the high-side transistor 3242 of the downstream power converter 124 is deactivated.

The method further includes releasing energy from the inductor 342, at block 546 in FIG. 5. When the upstream power converter 122 transitions from the high state to the low state, current through the inductor 342 decreases at a substantially fast rate. When the voltage of the switching node 116 is less than the voltage of the switching node 118, energy is transferred from the inductor 342 to the load 182. Thus, during this portion of the cycle, energy in the inductor 342 is being released.

The method can include deactivating the high-side transistor 3242 of the downstream convertor 124, at block 562 in FIG. 5. A few nanoseconds (<5 ns) later, the method further includes activating the low-side transistor 3244 of the downstream power converter 124, at block 564 in FIG. 5. The time delay between deactivating the high-side transistors 3222 and 3242 may at least in part depend on the operating frequency of the circuit 100, the current flowing to the load 182, or some other operating condition. For example, the time delay may be adjusted to balance the current that subsequently will flow through low-side transistors 3224 and 3244 once they are activated. Alternatively, the time delay may be adjusted to minimize the absolute value of the voltage difference across the inductor 342, after low-side transistors 3224 and 3244 are subsequently activated. As can be seen in FIG. 6, the voltage at the switching node 118 quickly decreases to 0 V. The voltage at the switching node 118 will dampen and eventually reach a voltage below ground potential, and such voltage can be in a range of 0 V to −0.5 V. Each of the low-side transistors 3224 and 3244 is in an activated state for approximately 900 ns. The time duration of the transistors 3224 and 3244 in the activated state can depend at least in part on the operation frequency of the circuit 100. The time duration can be changed if the operation frequency of the circuit 100 changes. After reading this specification, skilled artisans will be able determine a time duration for their particular application.

FIG. 7 includes a timing diagram of gate voltage as a function of time. Although the control device 162 is to provide a constant voltage to gates of the transistors 3222, 3224, 3242, and 3244 when such transistor are in a particular state, ringing at the switching nodes 116 and 118 can affect the gate voltage. In particular, gate-to-source capacitances for the high-side transistors 3222 and 3242 and gate-to-drain capacitances for the low-side transistors 3242 and 3244 affect the voltages on the gates of the transistors 3222, 3224, 3242, and 3244.

Embodiments as described herein can help to reduce voltage swings at an output switching node by storing energy within a magnetic element, such as an inductor. The reduced voltage swings allow some switching elements, such as transistors, to be designed to have a lower avalanche breakdown (e.g., drain-to-source breakdown) as compared to other switching elements in the circuit and allow higher doping levels within semiconductor layers to be used that can help to reduce $R_{DSON}$. Further, the reduced voltage swings can help to reduce driver logic disruptions within the control device. Energy is stored within the magnetic element when the circuit transitions from a low state to a high state, and energy is released when the circuit transitions from a high state to a low state. Thus, the circuit is more efficient as compared to a comparative circuit without a magnetic element that stores energy.

Further, the switching elements in the upstream and downstream power converters can be designed with different performance characteristics. The low-side switching element within the upstream power converter can be designed to withstand greater voltage swings at the intermediate switching node, and the low-side switching element within the downstream power converter does not need to withstand such large voltage swings because the output switching node experiences significantly less voltage swings. Thus, the low-side switching element of the downstream converter can be optimized more for higher current flow. Similarly, the high-side switching elements may be separately optimized for the conditions to which they will be exposed, particularly during switching operations.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A circuit comprising:
an input node, an output node, an intermediate node, and a reference node;
a first pair of switching devices with a first control terminal and a second control terminal, wherein the pair of switching devices is configured to provide a first conduction path between the input node and the intermediate node when a first control signal is applied to the first control terminal, and to provide a second conduction path between the intermediate node and the reference node when a second control signal is applied to the second control terminal;
a second pair of switching devices with a third and a fourth control terminal, wherein the second pair of switching devices is configured to provide a third conduction path between the input node and the output node when a third control signal is applied to the third control terminal, and to provide a fourth conduction path between the output node and the reference node when a fourth control signal is applied to the fourth control terminal;
a magnetic element coupled to the intermediate node and the output node such that current can flow through the magnetic element without passing through the second pair of switching devices; and
a control device configured to supply the first, second, third, and fourth control signals, such that the first and third control signals are simultaneously in a state to provide a conduction path to the input node during part of a switching period of the circuit.

Embodiment 2

The circuit of Embodiment 1, wherein the control device is configured such that the second and fourth control signals are simultaneously in a state to provide a conduction path from the reference node during part of a switching period of the circuit.

Embodiment 3

The circuit of Embodiment 1, wherein the control device is configured to supply the first control signal before the control device supplies the third control signal.

Embodiment 4

The circuit of Embodiment 3, wherein the control device is configured to terminate the first control signal before the third control signal ends a conduction path to the input node.

Embodiment 5

The circuit of Embodiment 1, wherein the first and third controls signals are simultaneously in a state to provide a conduction path to the input node for a time duration that is at least half as long as the total duration of time in which either control signals are in a state to provide a conduction path to the input node.

Embodiment 6

The circuit of Embodiment 1, wherein the magnetic element is an inductor with an inductance value of at most 24 nH.

Embodiment 7

The circuit of Embodiment 6, wherein the magnetic element is an inductor with an inductance value of at least 0.20 nH.

Embodiment 8

A circuit comprising:
a first power converter having a first power supply terminal, a second power supply terminal, a first control terminal, and a first output terminal;
a second power converter having a third power supply terminal, a fourth power supply terminal, a second control terminal, and a second output terminal;
a control device having a first output terminal and a second output terminal; and
a magnetic element having a first terminal and a second terminal,
wherein:
the first power supply terminal and the third power supply terminal are coupled to a first power supply node;
the second power supply terminal and the fourth power supply terminal are coupled a second power supply node;
the first control terminal of the first power converter is coupled to the first output terminal of the control device;
the second control terminal of the second power converter is coupled to the second output terminal of the control device;
the first output terminal of the first power converter and the first terminal of the magnetic element are coupled at a first switching node;

the second output terminal of the second power converter and the second terminal of the magnetic element are coupled at a second switching node; and
the control device is configured to allow the first and second power converters to be in a high state simultaneously or in a low state simultaneously.

Embodiment 9

The circuit of Embodiment 8, wherein the control device is configured to allow the first and second power converters to be in a high state simultaneously.

Embodiment 10

The circuit of Embodiment 9, wherein:
the first power converter includes a first switching element and a second switching element;
the second power converter includes a third switching element and a fourth switching element; and
each of the first and second power converters is a DC-to-DC power converter.

Embodiment 11

The circuit of Embodiment 10, wherein:
the first switching element comprises a first transistor coupled to the first switching node;
the second switching element comprises a second transistor coupled to the first switching node;
the third switching element comprises a third transistor coupled to the second switching node; and
the fourth switching element comprises a fourth transistor coupled to the second switching node.

Embodiment 12

The circuit of Embodiment 11, wherein:
the first transistor has a different performance characteristic as compared to the third transistor; or
the second transistor has a different performance characteristic as compared to the fourth transistor.

Embodiment 13

The circuit of Embodiment 11, wherein:
the first transistor is a first field-effect transistor having a first drain coupled to the first power supply terminal, a first source coupled to the first switching node, and a first gate electrode coupled to the control device;
the second transistor is a second field-effect transistor having a second drain coupled to the first switching node, a second source coupled to the second power supply terminal, and a second gate electrode coupled to the control device;
the third transistor is a third field-effect transistor having a third drain coupled to the first power supply terminal, a third source coupled to the second switching node, and a third gate electrode coupled to the control device; and
the fourth transistor is a fourth field-effect transistor having a fourth drain coupled to the second switching node, a fourth source coupled to the second power supply terminal, and a fourth gate electrode coupled to the control device.

Embodiment 14

The circuit of Embodiment 11, wherein the magnetic element includes an inductor.

Embodiment 15

The circuit of Embodiment 14, wherein the magnetic element is an inductor with an inductance value in a range of 0.02 nH to 50 nH.

Embodiment 16

A method of using a circuit comprising:
providing a circuit comprising:
an input node, an output node, an intermediate node, and a reference node;
a first high-side switching device having a first current-carrying terminal coupled to the input node, and a second current-carrying terminal coupled to the intermediate node;
a first low-side switching device having a third current-carrying terminal coupled to the intermediate node, and a fourth current-carrying terminal coupled to the reference node;
a second high-side switching device having a fifth current-carrying terminal coupled to the input node, and a sixth current-carrying terminal coupled to the output node;
a second low-side switching device having a seventh current-carrying terminal coupled to the output node, and an eighth current-carrying terminal coupled to the reference node; and
an inductor having a first terminal coupled to the intermediate node and a second terminal coupled to the output node;
activating the first high-side switching device; and
activating the second high-side switching device, wherein during a first time period, the first and second high-side switching devices are simultaneously in an activated state.

Embodiment 17

The method of Embodiment 16, wherein the activating of the second high-side switching device occurs when a voltage difference between the fifth and sixth current-carrying terminals of the second high-side switching device is less than half a voltage difference between the input node and the reference node.

Embodiment 18

The method of Embodiment 16, further comprising
deactivating the first high-side switching device; and
deactivating the second high-side switching device after deactivating the first high-side switching device.

Embodiment 19

The method of Embodiment 18, further comprising
activating the first low-side switching device after deactivating the first high-side switching device and before deactivating the second high-side switching device; and activating the second low-side switching device after deactivating both of the first and second high-side switching devices.

Embodiment 20

The method of Embodiment 19, wherein a time delay between deactivating the first high-side switching device and the second high-side switching device is adjusted to minimize an absolute value of a voltage difference across the inductor after activating the first low-side switching device and the second low-side switching device.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Accordingly, the disclosure is to be regarded as illustrative rather than restrictive.

What is claimed is:

1. A circuit comprising:
   an input node, an output node, an intermediate node, and a reference node;
   a first pair of switching devices with a first control terminal, a second control terminal, and a first output terminal, wherein the pair of switching devices is configured to provide a first conduction path between the input node and the intermediate node when a first control signal is applied to the first control terminal, and to provide a second conduction path between the intermediate node and the reference node when a second control signal is applied to the second control terminal;
   a second pair of switching devices with a third control terminal, a fourth control terminal, and a second output terminal, wherein the second pair of switching devices is configured to provide a third conduction path between the input node and the output node when a third control signal is applied to the third control terminal, and to provide a fourth conduction path between the output node and the reference node when a fourth control signal is applied to the fourth control terminal;
   a magnetic element having a first terminal and a second terminal, wherein the first terminal of the magnetic element and the first output terminal of the first pair of switching devices are directly connected to the intermediate node, the second terminal of the magnetic element and the second output terminal of the second pair of switching devices are directly connected to the output node, and current can flow through the magnetic element without passing through the second pair of switching devices; and
   a control device configured to supply the first, second, third, and fourth control signals, such that the first and third control signals are simultaneously in a state to provide a conduction path to the input node during part of a switching period of the circuit.

2. The circuit of claim 1, wherein the control device is configured such that the second and fourth control signals are simultaneously in a state to provide a conduction path from the reference node during part of a switching period of the circuit.

3. The circuit of claim 1, wherein the control device is configured to supply the first control signal before the control device supplies the third control signal.

4. The circuit of claim 3, wherein the control device is configured to terminate the first control signal before the third control signal ends a conduction path to the input node.

5. The circuit of claim 1, wherein the first and third controls signals are simultaneously in a state to provide a conduction path to the input node for a time duration that is at least half as long as the total duration of time in which either control signals are in a state to provide a conduction path to the input node.

6. The circuit of claim 1, wherein the magnetic element is an inductor with an inductance value of at most 24 nH.

7. The circuit of claim 6, wherein the magnetic element is an inductor with an inductance value of at least 0.20 nH.

8. A circuit comprising:
   a first power converter having a first power supply terminal, a second power supply terminal, a first control terminal, and a first output terminal;
   a second power converter having a third power supply terminal, a fourth power supply terminal, a second control terminal, and a second output terminal;
   a control device having a first output terminal and a second output terminal; and
   a magnetic element having a first terminal and a second terminal,
   wherein:
     the first power supply terminal and the third power supply terminal are coupled to a first power supply node;
     the second power supply terminal and the fourth power supply terminal are coupled a second power supply node;
     the first control terminal of the first power converter is coupled to the first output terminal of the control device;
     the second control terminal of the second power converter is coupled to the second output terminal of the control device;
     the first output terminal of the first power converter and the first terminal of the magnetic element are directly connected to a first switching node; the second output terminal of the second power converter and the second terminal of the magnetic element are directly connected to a second switching node that is an output node of the circuit.

9. The circuit of claim 8, wherein the control device is configured to allow the first and second power converters to be in a high state simultaneously.

10. The circuit of claim 9, wherein:
the first power converter includes a first switching element and a second switching element;
the second power converter includes a third switching element and a fourth switching element; and
each of the first and second power converters is a DC-to-DC power converter.

11. The circuit of claim 10, wherein:
the first switching element comprises a first transistor coupled to the first switching node;
the second switching element comprises a second transistor coupled to the first switching node;
the third switching element comprises a third transistor coupled to the second switching node; and
the fourth switching element comprises a fourth transistor coupled to the second switching node.

12. The circuit of claim 11, wherein:
the first transistor has a different performance characteristic as compared to the third transistor; or
the second transistor has a different performance characteristic as compared to the fourth transistor.

13. The circuit of claim 11, wherein:
the first transistor is a first field-effect transistor having a first drain coupled to the first power supply terminal, a first source coupled to the first switching node, and a first gate electrode coupled to the control device;
the second transistor is a second field-effect transistor having a second drain coupled to the first switching node, a second source coupled to the second power supply terminal, and a second gate electrode coupled to the control device;
the third transistor is a third field-effect transistor having a third drain coupled to the first power supply terminal, a third source coupled to the second switching node, and a third gate electrode coupled to the control device; and
the fourth transistor is a fourth field-effect transistor having a fourth drain coupled to the second switching node, a fourth source coupled to the second power supply terminal, and a fourth gate electrode coupled to the control device.

14. The circuit of claim 11, wherein the magnetic element includes an inductor.

15. The circuit of claim 14, wherein the magnetic element is an inductor with an inductance value in a range of 0.02 nH to 50 nH.

16. A method of using a circuit comprising:
providing the circuit comprising:
an input node, an output node, an intermediate node, and a reference node;
a first high-side switching device having a first current-carrying terminal coupled to the input node, and a second current-carrying terminal coupled to the intermediate node;
a first low-side switching device having a third current-carrying terminal coupled to the intermediate node, and a fourth current-carrying terminal coupled to the reference node;
a second high-side switching device having a fifth current-carrying terminal coupled to the input node, and a sixth current-carrying terminal coupled to the output node;
a second low-side switching device having a seventh current-carrying terminal coupled to the output node, and an eighth current-carrying terminal coupled to the reference node; and
an inductor having a first terminal coupled to the intermediate node and a second terminal coupled to the output node;
activating the first high-side switching device; and
activating the second high-side switching device, wherein during a first time period, the first and second high-side switching devices are simultaneously in an activated state, wherein the activating of the second high-side switching device occurs when a voltage difference between the fifth and sixth current-carrying terminals of the second high-side switching device is less than half a voltage difference between the input node and the reference node.

17. The method of claim 16, further comprising
deactivating the first high-side switching device; and
deactivating the second high-side switching device after deactivating the first high-side switching device.

18. The method of claim 17, further comprising
activating the first low-side switching device after deactivating the first high-side switching device and before deactivating the second high-side switching device; and
activating the second low-side switching device after deactivating both of the first and second high-side switching devices.

19. The method of claim 18, wherein a time delay between deactivating the first high-side switching device and the second high-side switching device is adjusted to minimize an absolute value of a voltage difference across the inductor after activating the first low-side switching device and the second low-side switching device.

* * * * *